US010262444B2

United States Patent
Kikuta

(10) Patent No.: US 10,262,444 B2
(45) Date of Patent: Apr. 16, 2019

(54) IMAGE PROCESSING APPARATUS, IMAGE PROCESSING METHOD, AND NON-TRANSITORY COMPUTER-READABLE STORAGE MEDIUM FOR CREATING A COMPOSITE IMAGE BY USING A PLURALITY OF INPUT IMAGES

(71) Applicant: CANON KABUSHIKI KAISHA, Tokyo (JP)

(72) Inventor: Kyohei Kikuta, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 129 days.

(21) Appl. No.: 15/385,736

(22) Filed: Dec. 20, 2016

(65) Prior Publication Data

US 2017/0186202 A1   Jun. 29, 2017

(30) Foreign Application Priority Data

Dec. 25, 2015   (JP) .................................. 2015-254346

(51) Int. Cl.
| | |
|---|---|
| G06K 9/00 | (2006.01) |
| G06T 3/40 | (2006.01) |
| G06T 11/60 | (2006.01) |
| G06T 7/13 | (2017.01) |
| G06T 5/00 | (2006.01) |

(52) U.S. Cl.
CPC .......... *G06T 11/60* (2013.01); *G06K 9/00026* (2013.01); *G06T 3/4038* (2013.01); *G06T 5/003* (2013.01); *G06T 7/13* (2017.01); *G06T 2200/32* (2013.01); *G06T 2207/10016* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,398,309 A * | 3/1995 | Atkins | .................... | G06T 11/00 |
| | | | | 345/634 |
| 5,854,634 A * | 12/1998 | Kroitor | .................. | G06T 13/00 |
| | | | | 345/473 |
| 6,442,303 B1 * | 8/2002 | Meijers | .................... | H04N 7/01 |
| | | | | 345/606 |
| 7,974,494 B2 * | 7/2011 | Kawamura | .......... | G06F 3/1454 |
| | | | | 345/642 |

(Continued)

FOREIGN PATENT DOCUMENTS

JP   2001-067488 A   3/2001

*Primary Examiner* — Yubin Hung
(74) *Attorney, Agent, or Firm* — Canon U.S.A., Inc. IP Division

(57) ABSTRACT

Image processing for creating a composite image by using a plurality of input images is performed in the following manner. An ID map is created in which each pixel on a coordinate system of the composite image is assigned an ID value among ID values each of which identifies a corresponding one of the plurality of input images. The composite image is created based on the ID map. The composite image and the ID map are caused to be superimposed and displayed on a display device. User input that is a drag operation performed on the ID map that is superimposed and displayed together with the composite image is obtained. The ID map is changed in accordance with the user input. The composite image is updated in accordance with the change in the ID map.

13 Claims, 14 Drawing Sheets

(56) References Cited

U.S. PATENT DOCUMENTS

| | | | | |
|---|---|---|---|---|
| 2002/0180727 | A1* | 12/2002 | Guckenberger | G06T 11/60 345/418 |
| 2002/0181762 | A1* | 12/2002 | Silber | G06T 5/50 382/154 |
| 2007/0107018 | A1* | 5/2007 | Song | H04N 19/61 725/69 |
| 2008/0253685 | A1* | 10/2008 | Kuranov | G06T 3/4038 382/284 |
| 2010/0145195 | A1* | 6/2010 | Hyun | A61B 8/00 600/437 |
| 2010/0278504 | A1* | 11/2010 | Lyons | G06F 3/0481 386/278 |
| 2013/0014041 | A1* | 1/2013 | Jaeger | G06F 3/0481 715/765 |
| 2013/0028472 | A1* | 1/2013 | Pham | G06T 7/0026 382/103 |
| 2013/0121618 | A1* | 5/2013 | Yadav | G06T 5/008 382/294 |
| 2013/0287304 | A1* | 10/2013 | Kimura | G06T 7/0028 382/199 |
| 2013/0329132 | A1* | 12/2013 | Tico | H04N 5/14 348/571 |
| 2015/0154805 | A1* | 6/2015 | Hsu | G06T 15/04 345/420 |
| 2016/0063705 | A1* | 3/2016 | Xu | G06T 5/50 382/199 |
| 2016/0367210 | A1* | 12/2016 | Gkanatsios | A61B 6/025 |

* cited by examiner

IMAGE PROCESSING APPARATUS, IMAGE PROCESSING METHOD, AND NON-TRANSITORY COMPUTER-READABLE STORAGE MEDIUM FOR CREATING A COMPOSITE IMAGE BY USING A PLURALITY OF INPUT IMAGES

BACKGROUND OF THE INVENTION

Field of the Invention

The present disclosure relates to a process of generating a wide-field-of-view image by combining a plurality of images together.

Description of the Related Art

Methods for obtaining an image having a higher resolution and a wider field of view than an image obtained by a single image capturing operation include a method in which a plurality of images are combined by linking them together to generate a single output image. This process of combining is called image stitching. An example of the image stitching process is as follows. A relative positional relationship between positions of cameras at the time of capturing a plurality of input images is first estimated based on the plurality of input images. Then, the input images are mapped onto a common output image coordinate system on the basis of the estimated relative positional relationship to obtain mappings of the respective input images. In each region where mappings overlap, an alpha blending process (hereinafter, referred to as a blending process) is performed on the overlapping images. In this way, an output image is generated. There are cases where a boundary of images to be linked to each other is determined in the overlapping region and the blending process is performed only in the vicinity of the boundary, instead of performing the blending process in the whole overlapping region.

The relative positions of the input images and the position of the boundary where the blending process is performed are important parameters in the image stitching process described above. Depending on these parameters, artifacts such as multiple images, degradation in sharpness, and discontinuous color changes at the boundary, may occur in the output image. Accordingly, it is desirable that the user be allowed to precisely control these parameters according to their intention particularly in the case where a high-quality output image is desired.

Japanese Patent Laid-Open No. 2001-067488 discloses a technique that allows a user to control parameters of the image stitching process. Specifically, it discloses a configuration that allows the user to move each input image or specify a corresponding point of the input images while viewing the input images on a display screen and to adjust relative positions of the input images.

However, in order to reduce degradation of image sharpness, the blending process is desirably performed only in the vicinity of the boundary that is determined in the overlapping region. In such a case, not only the relative positions of images but also the position of the boundary serve as important parameters to obtain a high-quality output image. With the technique disclosed in Japanese Patent Laid-Open No. 2001-067488, the user is able to control the relative positions of input images but is unable to control the position of the boundary. On the other hand, the boundary is a parameter that can be set two-dimensionally in any way in the overlapping region. A technique for assisting the user in controlling such a parameter having a high degree of freedom is desired.

SUMMARY OF THE INVENTION

An aspect of the present disclosure provides image processing that allows a user to precisely control a boundary in an image stitching process according to their intention.

An image processing apparatus according to an aspect of the present disclosure is an image processing apparatus that creates a composite image by using a plurality of input images. The image processing apparatus includes a map creating unit configured to create an identifier (ID) map in which each pixel on a coordinate system of the composite image is assigned an ID value among ID values each of which identifies a corresponding one of the plurality of input images, an image creating unit configured to create the composite image based on the ID map, a display control unit configured to cause the composite image and the ID map to be superimposed and displayed on a display device, and an obtaining unit configured to obtain user input that is a drag operation performed on the ID map that is superimposed and displayed together with the composite image. The map creating unit changes the ID map in response to the user input. The image creating unit updates the composite image in accordance with the change in the ID map.

Further features of the present disclosure will become apparent from the following description of exemplary embodiments with reference to the attached drawings.

DESCRIPTION OF THE EMBODIMENTS

Exemplary embodiments will be described below with reference to the accompanying drawings. It should be noted that the exemplary embodiments described below do not limit the present invention, and all the combinations of features described below are not necessarily mandatory to solutions provided herein. The same reference signs have been assigned to the same or substantially the same components.

First Exemplary Embodiment

An information processing apparatus according to a first exemplary embodiment performs an image stitching process for generating a single output image by linking a plurality of input images together. In order to obtain a high-quality output image, the boundary of images to be linked in the image stitching process is controlled by the user. In first exemplary embodiment, as a method for assisting the user in precisely controlling the boundary according to their intention, an ID map representing which region of the output image is associated with which one of the plurality of input images and a composite image created based on the ID map are superimposed and the resultant image is presented to the user on a display screen. If the user is not satisfied with the composite image, the user performs an operation for changing the ID map (position of the boundary) on the display screen. In response to the user operation, the composite image is updated. Since the user is allowed to repeatedly change the ID map by checking the cause and result based on the position of the boundary, the user's intention can be reflected in the composite image and an output image that satisfies the user can be output. Hereinafter, the composite image checked by the user is referred to as a preview image.

Figure 1:
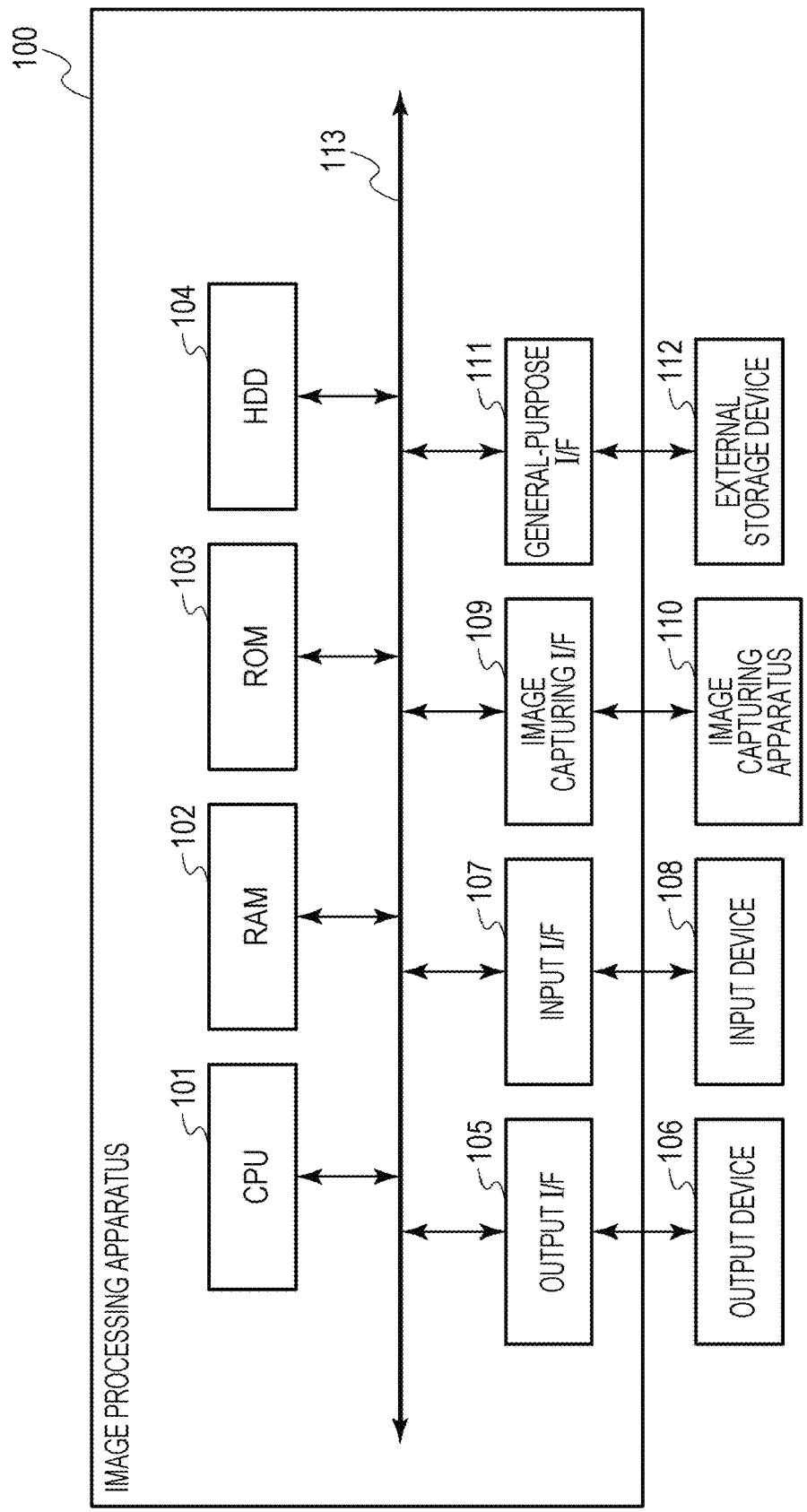
FIG. 1 is a diagram illustrating a hardware configuration of an image processing apparatus.

FIG. 1 is a diagram illustrating a hardware configuration of an image processing apparatus 100 that can be used in the first exemplary embodiment. The image processing apparatus 100 includes a central processing unit (CPU) 101, a random access memory (RAM) 102, a read-only memory (ROM) 103, a hard disk drive (HDD) 104, an output interface (I/F) 105, an input I/F 107, an image capturing I/F 109, and a general-purpose I/F 111. The image processing apparatus 100 also includes a general-purpose system bus 113 that connects the components of the image processing apparatus 100 to one another.

The CPU 101 is a processor that integrally controls the components of the image processing apparatus 100. The RAM 102 is a memory that functions as, for example, a main memory and a workspace for the CPU 101. The ROM 103 is a memory that stores a group of programs to be executed by the CPU 101. The HDD 104 is a storage medium that stores, for example, applications to be executed by the CPU 101 and data used in image processing.

The output I/F 105 is an image output interface, for example, Digital Visual Interface (DVI) or High-Definition Multimedia Interface (HDMI) (registered trademark). The output I/F 105 connects an output device 106, such as a liquid crystal display, to the image processing apparatus 100. The input I/F 107 is a serial bus interface, for example, Universal Serial Bus (USB) or IEEE 1394. The input I/F 107 connects an input device 108, such as a keyboard or a mouse used by the user to perform various instruction operations, to the image processing apparatus 100. The image capturing I/F 109 is an image input interface, for example, 3G/HD-SDI or HDMI (registered trademark). The image capturing I/F 109 connects an image capturing apparatus (camera) 110 that obtains digital image data by performing image capturing to the image processing apparatus 100. The general-purpose I/F 111 is a serial bus interface, such as USB or IEEE 1394, just like the input I/F 107. The general-purpose I/F 111 connects an external storage device 112 to the image processing apparatus 100 if necessary.

Figure 2:
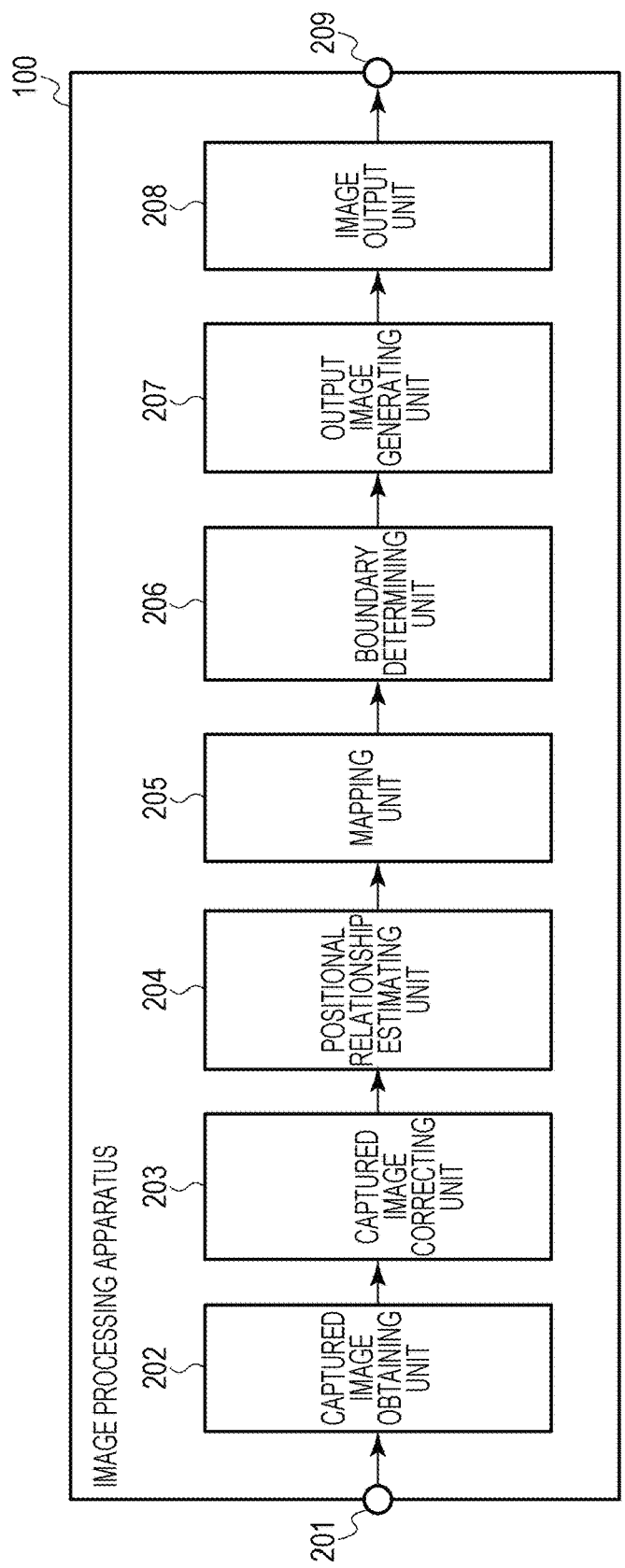
FIG. 2 is a block diagram illustrating a functional configuration of the image processing apparatus.

FIG. 2 is a block diagram illustrating a functional configuration of the image processing apparatus 100 according to the first exemplary embodiment. The functional configuration illustrated in FIG. 2 is implemented as a result of the CPU 101 reading a program stored on the ROM 103 or the HDD 104 and executing the program by using the RAM 102 as a workspace. However, how the functional configuration is implemented is not limited to the functional configuration illustrated in FIG. 2, and may be entirely or partially implemented by providing a dedicated processing circuit. As illustrated in FIG. 2, the image processing apparatus 100 includes a captured image obtaining unit 202, a captured image correcting unit 203, a positional relationship estimating unit 204, a mapping unit 205, a boundary determining unit 206, an output image generating unit 207, and an image output unit 208.

The captured image obtaining unit 202 obtains a plurality of captured images (input images) via an input terminal 201. The captured image correcting unit 203 performs correction processing on each captured image. The positional relationship estimating unit 204 estimates a positional relationship between positions of cameras at the time of image capturing on the basis of the corrected images. The mapping unit 205 maps the corrected images onto a common output image coordinate system on the basis of the positional relationship of the positions of the cameras and obtains mappings of the respective corrected images. The boundary determining unit 206 determines a boundary in a region where the mappings overlap. The output image generating unit 207 combines the corrected images on the basis of the determined boundary and generates an output image. The image output unit 208 outputs the generated output image via an output terminal 209.

Figure 3:
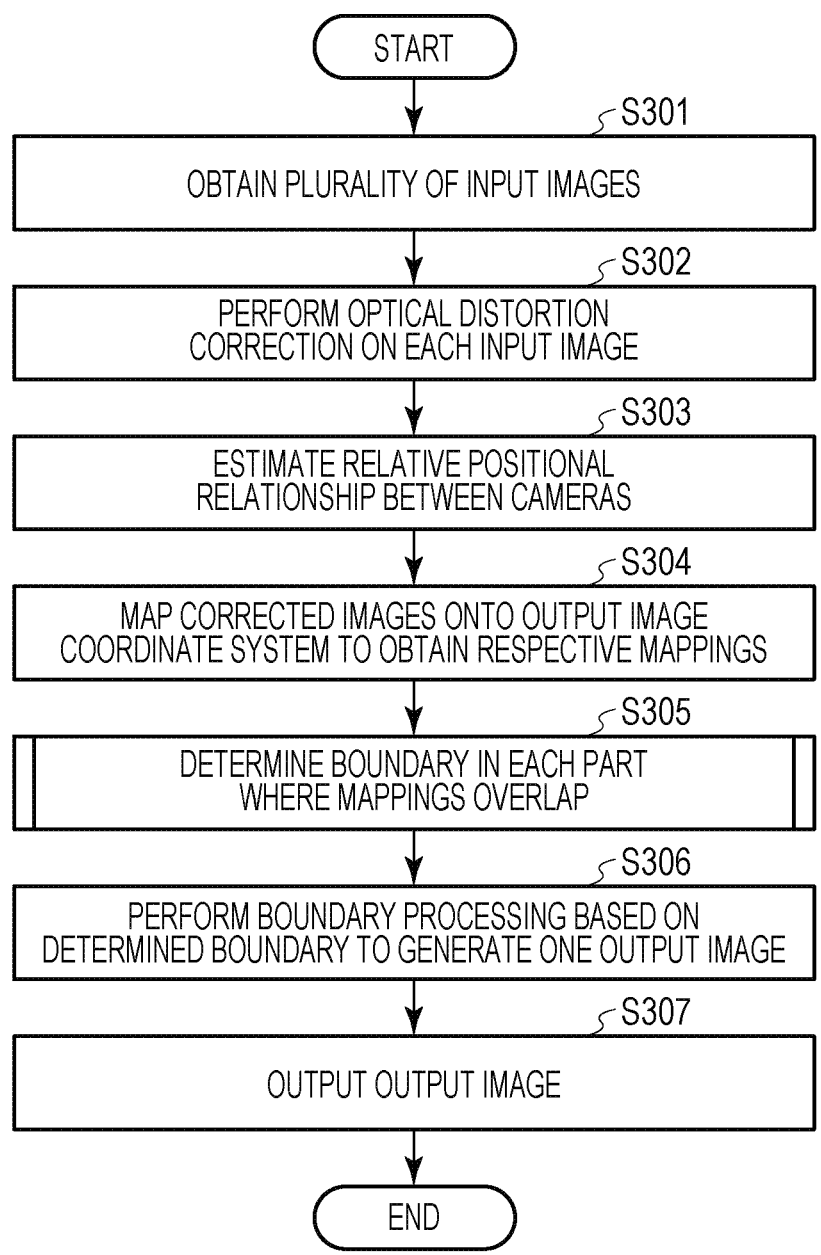
FIG. 3 is a flowchart illustrating an image stitching process performed by the image processing apparatus according to a first exemplary embodiment.

FIG. 3 is a flowchart illustrating an image stitching process performed by the image processing apparatus 100 according to the first exemplary embodiment. In step S301, the captured image obtaining unit 202 obtains a plurality of captured images (input images) via the input terminal 201. The obtained images may be captured images captured using the image capturing apparatus 110 or captured images stored on the RAM 102, the external storage device 112, or the like in advance.

In step S302, the captured image correcting unit 203 performs a correction process on the obtained captured images. The captured images containing an influence of an optical distortion caused by a lens are usually obtained. The captured image correcting unit 203 performs a correction process (optical distortion correction) on the captured images to reduce the influence of the optical distortion. In the optical distortion correction, any known method such as rearranging pixels on the basis of the characteristics of the lens used for image capturing can be used. In addition, the processing in the correction process of step S302 may be replaced with another correction processing or the correction process of step S302 may additionally include another correction processing. For example, shading correction may be additionally included.

In step S303, the positional relationship estimating unit 204 estimates a positional relationship between positions of cameras at the time of image capturing on the basis of the corrected images. Specifically, the positional relationship estimating unit 204 first extracts a feature point from each of the corrected images and associates the feature points of the plurality of corrected images with one another. Then, the positional relationship estimating unit 204 determines a relative positional relationship between the positions of the cameras on the basis of the associated feature points.

In step S304, the mapping unit 205 maps the corrected images onto an output image coordinate system (coordinate system of the preview image) on the basis of the estimated positional relationship between the positions of the cameras and obtains mappings of the corrected images. In this way, the information of the plurality of images is collected in the common output image coordinate system. Note that the output image coordinate system used in this case is not limited to the perspective projection coordinate system, which is often used for photographs, and another coordinate system, such as the equirectangular projection coordinate system, may be used according to the usage of the output image.

In step S305, the boundary determining unit 206 determines a boundary in a region where the mappings overlap. The boundary is a line used to determine which mapping is to be used in the region where the mappings on the output image coordinate system overlap. Details about the boundary determining process performed in step S305 will be described later. In step S306, the output image generating unit 207 combines the images together on the basis of the boundary determined in step S305 and generates a single output image (e.g., a panorama image). That is, the mappings of the respective images are linked together on the basis of the boundary. At the time, the output image generating unit 207 performs a blending process (boundary processing) on the overlapping mappings in the vicinity of the boundary to suppress a state where the image abruptly changes at the position of the boundary and become discontinuous.

In step S307, the image output unit 208 outputs the output image generated in step S306 to the HDD 104, the output device 106, the external storage device 112, or the like via the output terminal 209. Then, the image stitching process performed by the image processing apparatus 100 ends.

Figure 4:
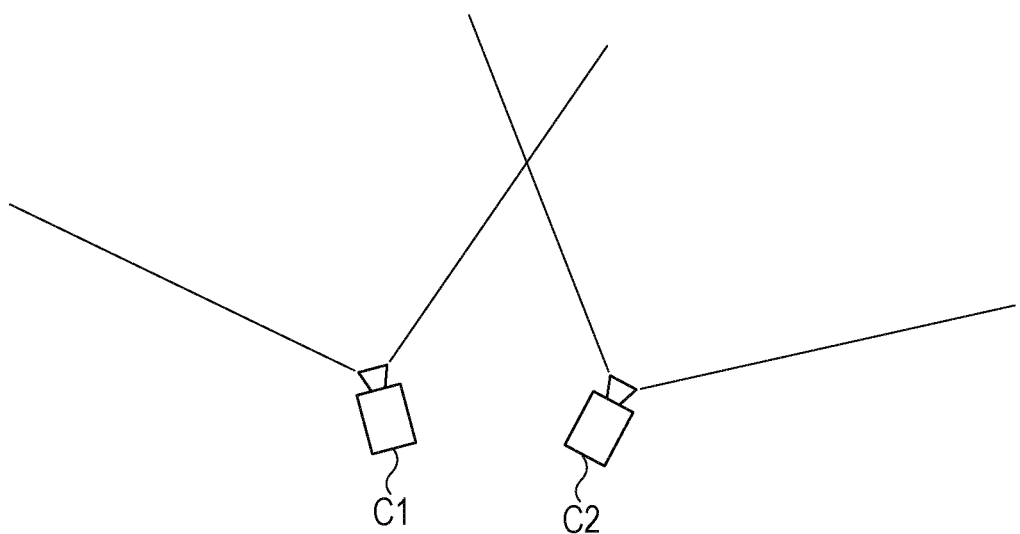
FIG. 4 illustrates a positional relationship between positions of image capturing apparatuses in accordance with the first exemplary embodiment.

An example of the image stitching process will be described next with reference to FIGS. 4 to 6. FIG. 4 is a diagram illustrating a positional relationship between positions of image capturing apparatuses in the first exemplary embodiment. It is assumed that the captured images used in the first exemplary embodiment are captured using cameras C1 and C2 which are arranged by side by side as illustrated in FIG. 4. The input images are subjected to a correction process for reducing the influence of an optical distortion in step S302. Images 1 and 2 obtained by correction are mapped onto a common output image coordinate system in step S304.

Figure 5:
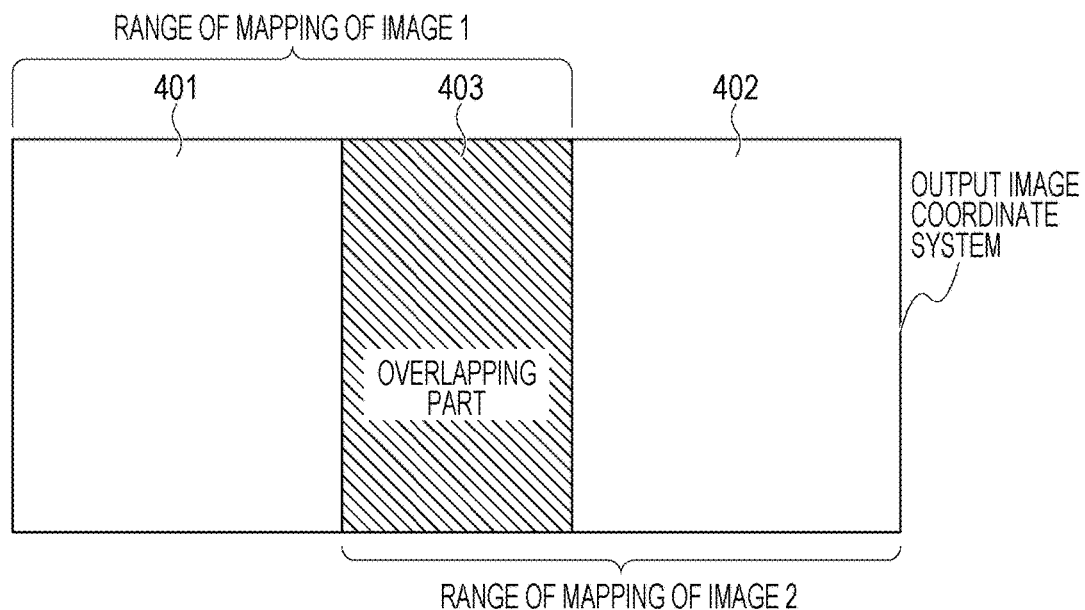
FIG. 5 is a diagram illustrating mappings of images that are mapped onto an output image coordinate system in accordance with the first exemplary embodiment.

FIG. 5 is a diagram illustrating mappings obtained by mapping the images 1 and 2 onto the output image coordinate system according to the first exemplary embodiment.

As illustrated in FIG. 5, a mapping of the image 1 includes a region 401 and a region 403, whereas a mapping of the image 2 includes a region 402 and the region 403. The region 403 is a region where the mappings of the images 1 and 2 overlap. When the output image is generated, information (pixel values) of the image 1 and information (pixel values) of the image 2 are used in the region 401 and the region 402, respectively. On the other hand, both information of the image 1 and information of the image 2 are usable in the region 403 which is the overlapping part.

Figure 6:
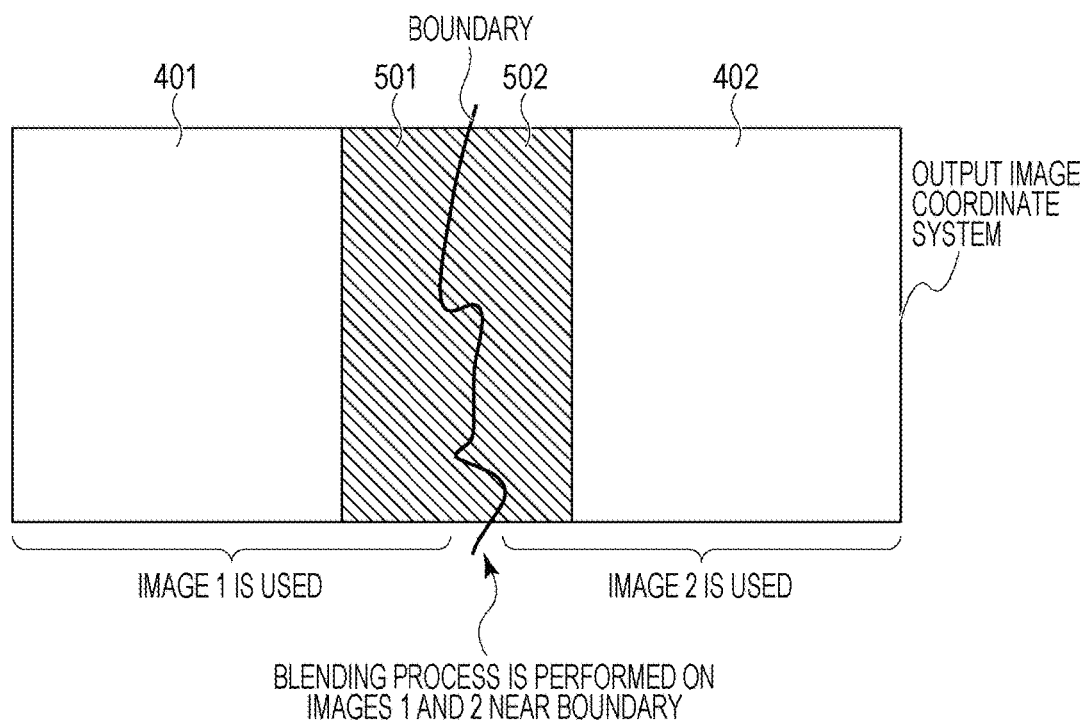
FIG. 6 is a diagram for describing a boundary in accordance with the first exemplary embodiment.

FIG. 6 is a diagram for describing a boundary in the first exemplary embodiment. In step S305, the boundary is determined as illustrated in FIG. 6. The region 403, which is the overlapping part, is divided into a region 501 on the left side and a region 502 on the right side by the boundary. When the output image is generated, information of the image 1 and information of the image 2 are used in the region 501 and the region 502, respectively. In other words, the mapping of the image 1 is used on the left side and the mapping of the image 2 is used on the right side on the output image coordinate system, and the boundary defines the border of the left side and the right side. However, the output image is generated by performing a blending process in the vicinity of the boundary by using both the mapping of the image 1 and the mapping of the image 2.

Figure 7A:
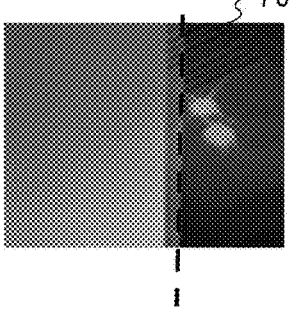
FIGS. 7A and 7B are diagrams illustrating an example in which the quality of an output image changes depending on the position of the boundary.
Figure 7B:
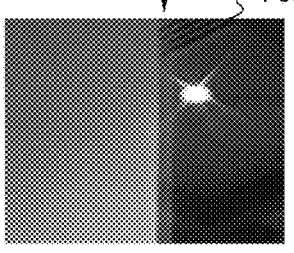

The position of the boundary influences the quality of the output image greatly. The influence of the position of the boundary will be described below with reference to FIGS. 7A to 8B. FIGS. 7A and 7B are diagrams illustrating an example in which the quality of an output image changes depending on the position of the boundary. An image 701 illustrates the mapping overlapping part on the output image coordinate system. The image 701 shows a result obtained by superimposing the mappings of the images 1 and 2. Since the positions of the cameras used to capture the images 1 and 2 are different, the positions of an object in the scene do not necessarily match and are relatively shifted from each other. Accordingly, such an object is seen as multiple images in the image 701. Such a positional shift is conspicuous particularly when the cameras are arranged with a large angle therebetween as illustrated in FIG. 4.

FIGS. 7A and 7B illustrate the cases where the boundary is set to different positions in the mapping overlapping part. The position of the boundary in the image 701 is denoted by a dash line. The output images obtained in the cases illustrated in FIGS. 7A and 7B are images 702 and 703, respectively. The position of the boundary in the output image is indicated by an arrow. Information of the two images is used by the blending process in the vicinity of the boundary. Accordingly, the information of the two images having a positional shift is used in the image 702, and consequently multiple images appear. In contrast, since portions of the two images in the vicinity of the boundary are substantially flat, the multiple images are less conspicuous in the image 703 than in the image 702 although the information of the two images having a positional shift is used also in the image 703.

Figure 8A:
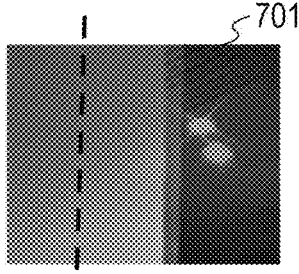
FIGS. 8A and 8B are diagrams illustrating another example in which the quality of an output image changes depending on the position of the boundary.
Figure 8B:
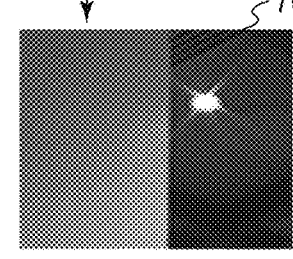

FIGS. 8A and 8B are diagrams illustrating another example in which the quality of an output image changes depending on the position of the boundary. FIG. 8A illustrates the same case as the case illustrated in FIG. 7B. In FIG. 8B, the boundary is set at a position different from that of FIG. 8A, and an output image obtained in this case is an image 802. Although the boundary is set in the flat portion of the image as in FIG. 8A, a slight color difference is caused at the position of the boundary in the image 802 due to a slight difference in illumination conditions or the like of the scene between the two images.

As is apparent from the examples illustrated in FIGS. 7A to 8B, the change in the position of the boundary influences the quality of the output image greatly. Although the examples illustrated in FIGS. 7A to 8B show a relatively simple scene, some of actual scenes are more complicated, and various boundary settings are possible depending on the scene. Accordingly, it is difficult for an image processing apparatus to automatically determine an optimum boundary in any given images all the time in the practical cases. In addition, since the user's intention of creating the image should be reflected in the output image, it is considered that the desired position of the boundary differs from user to user even if the input images and various conditions are the same.

Figure 9:
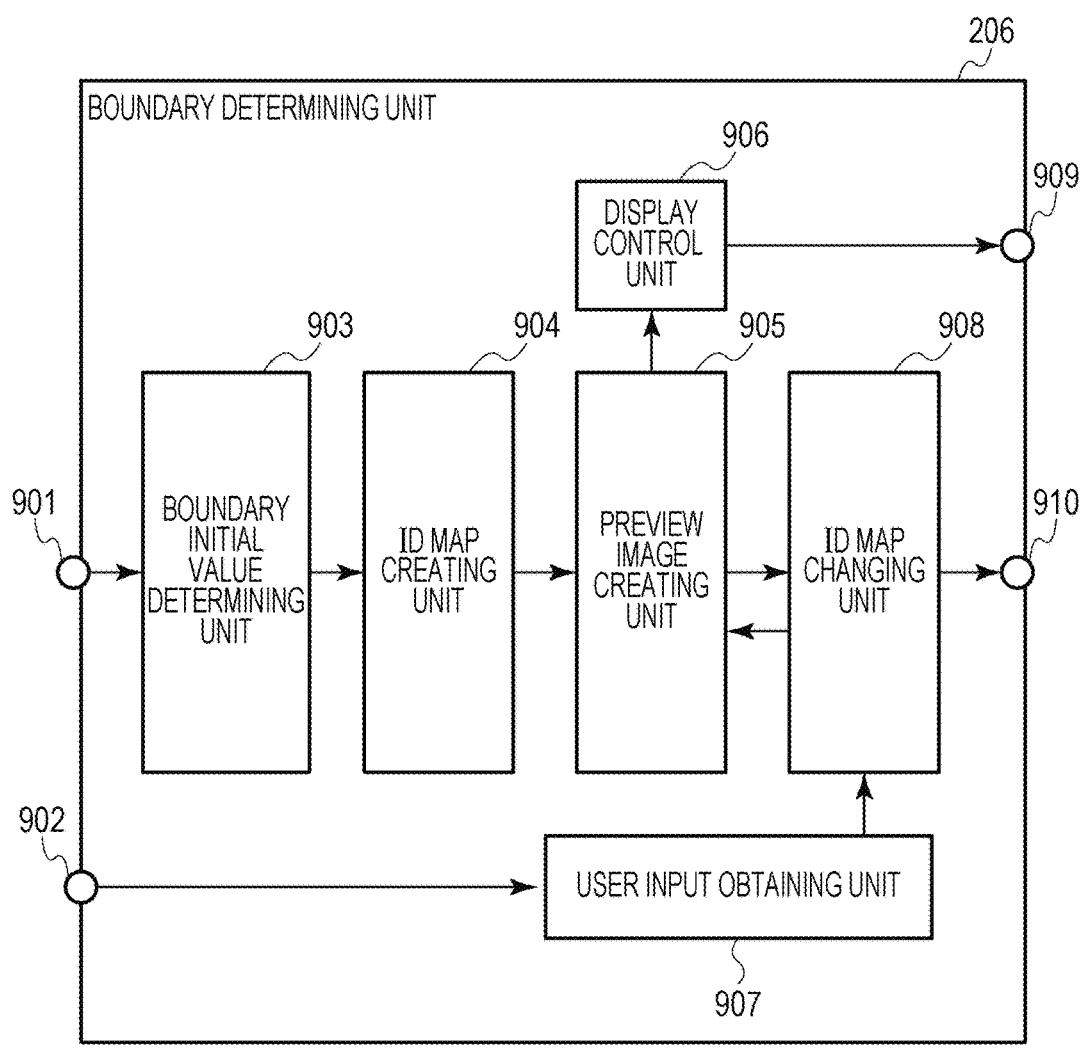
FIG. 9 is a block diagram illustrating a functional configuration of a boundary determining unit according to the first exemplary embodiment.

To cope with the circumstances described above, it is desirable that the user be allowed to precisely control or fix the boundary according to their intention particularly when the user desires to create a high-quality output image. Details of the boundary determining process according to the first exemplary embodiment will be described below with reference to FIGS. 9 and 10. FIG. 9 is a block diagram illustrating a functional configuration of the boundary determining unit 206 according to the first exemplary embodiment. As illustrated in FIG. 9, the boundary determining unit 206 includes a boundary initial value determining unit 903, an ID map creating unit 904, a preview image creating unit 905, a display control unit 906, a user input obtaining unit 907, and an ID map changing unit 908.

The boundary initial value determining unit 903 receives information of mappings of images on the output image coordinate system from the mapping unit 205 via an input terminal 901 and determines the initial value of the boundary on the basis of the information. The ID map creating unit 904 creates an ID map, which indicates identifies (IDs) of images to be used in the respective regions of a preview image, on the basis of the initial value of the boundary. The preview image creating unit 905 creates a preview image on the basis of the ID map. The display control unit 906 performs control to superimpose and display the preview image and the ID map on the output device 106, such as a liquid crystal display, via an output terminal 909. The user input obtaining unit 907 accepts user input via an input terminal 902. The ID map changing unit 908 changes the ID map (boundary) on the basis of the user input. In response to the change in the ID map, the preview image creating unit 905 creates the preview image again in accordance with the ID map for which the boundary has been changed. The display control unit 906 updates the preview image displayed on the output device 106.

Figure 10:
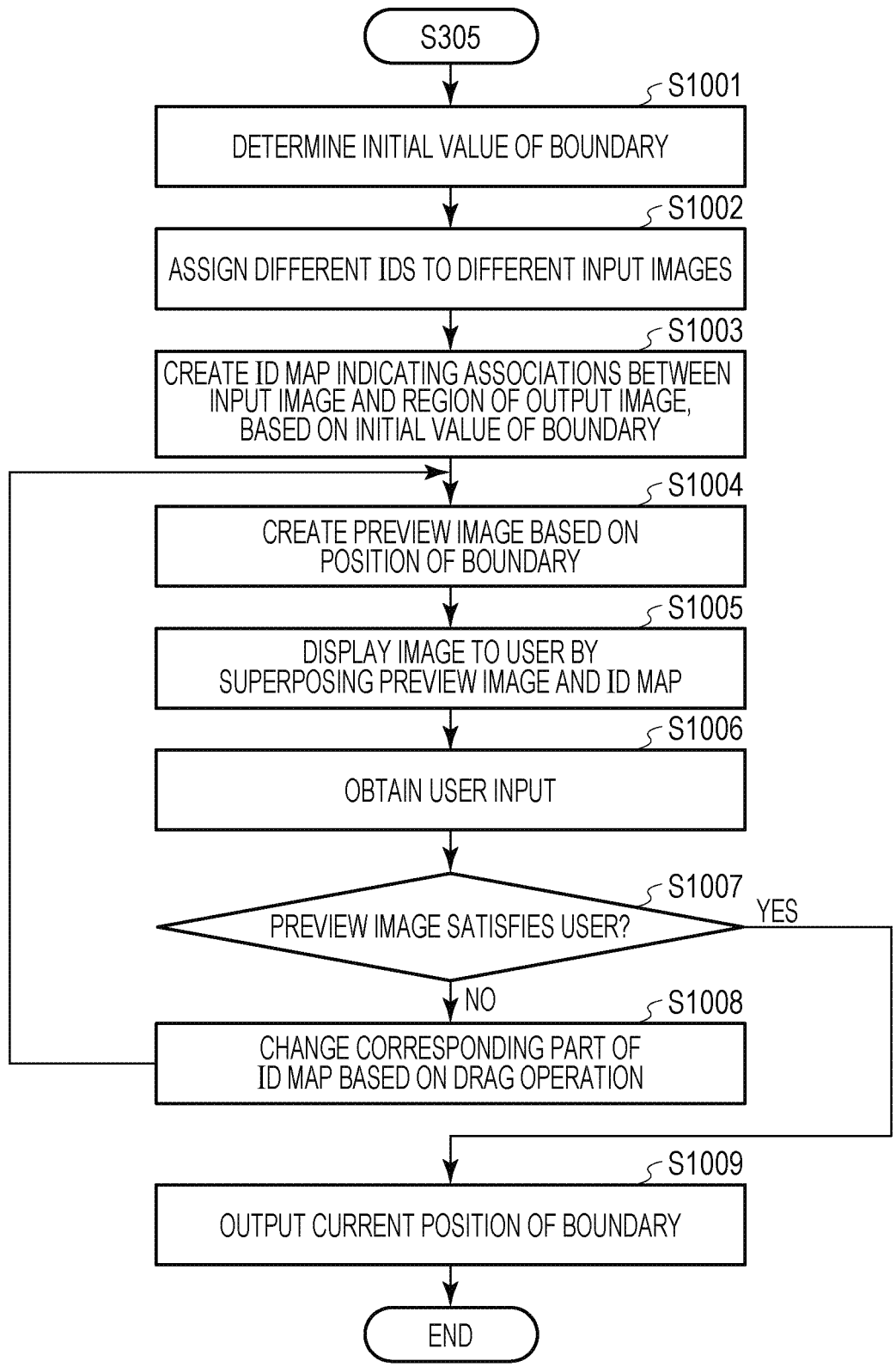
FIG. 10 is a flowchart illustrating a boundary determining process according to the first exemplary embodiment.

FIG. 10 is a flowchart illustrating a boundary determining process according to the first exemplary embodiment. In step S1001, the boundary initial value determining unit 903 determines the initial value of the boundary in the mapping overlapping part on the basis of information of mappings of images on the output image coordinate system. For example, the initial value of the boundary is determined as illustrated in FIG. 6. Any known technique, for example, a method for calculating the boundary by using pixel values or a gradient in the pixel values or setting the boundary so as to use closest images, can be used as the boundary determining method in step S1001.

Figure 11:
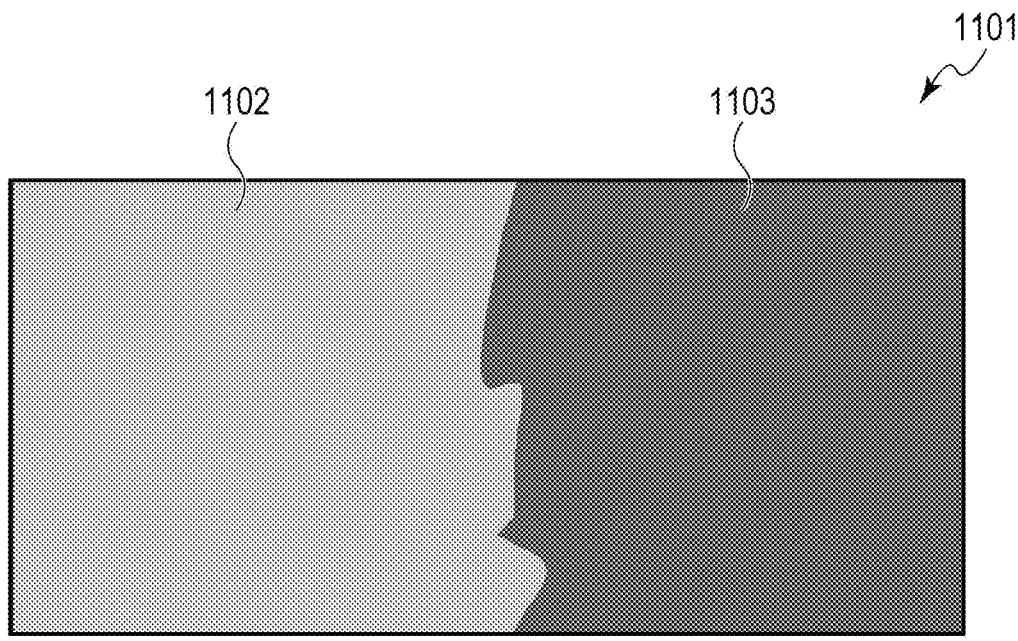
FIG. 11 is a diagram illustrating an ID map according to the first exemplary embodiment.

In step S1002, the ID map creating unit 904 assigns different IDs to different input images. For example, the ID map creating unit 904 assigns an ID "1" to the image captured using the camera C1 and an ID "2" to the image captured using the camera C2. An association between the ID and the input image is maintained even after the input image is corrected in step S302 and is mapped onto the output image coordinate system in step S304. In step S1003, the ID map creating unit 904 creates the ID map, which indicates which region of the output image is associated with which input image, on the basis of the initial value of the boundary. The ID map is data that typically has the same coordinate system and the same size as the output image and stores the ID of the input image corresponding to the position of each pixel. For example, the ID map is created as illustrated in FIG. 11. The ID "1" and the ID "2" are stored for a region 1102 and a region 1103 of an ID map 1101, respectively.

In step S1004, the preview image creating unit 905 creates a preview image on the basis of the ID map. Specifically, the preview image creating unit 905 creates a preview image by combining the image 1 and the image 2 together on the output image coordinate system on the basis of the position of the boundary in the ID map. It is assumed that the combining processing is substantially the same as the processing performed by the output image generating unit 207 in step S306. However, the boundary processing may be omitted to reduce the processing load. In step S1005, the display control unit 906 performs control to superimpose and display the ID map and the preview image together on the output device 106. That is, a screen in which the ID map and the preview image are superimposed is presented to the user.

Figure 12:
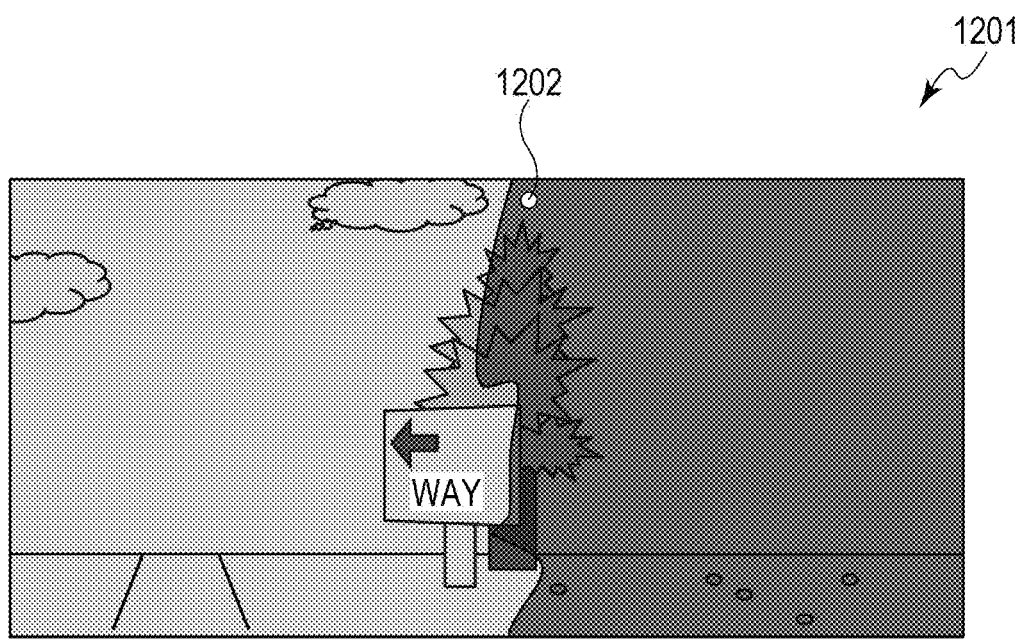
FIG. 12 is a diagram schematically illustrating an ID map and a preview image presented to a user in accordance with the first exemplary embodiment.

FIG. 12 is a diagram schematically illustrating an example of the screen presented to the user. In an image display region 1201 of the screen, the ID map illustrated in FIG. 11 and the preview image are superimposed and displayed. When the user sees the presented screen, the user can identify the ID of the image used at each pixel to create the preview image.

Note that the pixel values used to display the ID map need not necessarily be the same as the corresponding ID value of the corresponding region, and pixel values with which the user can identify each region of the corresponding ID can be used. For example, the ID map can be displayed by setting a luminance difference to make distinction easier, such as by setting the pixel value of the region associated with the ID "1" to 64 and setting the pixel value of the region associated with the ID "2" to 128. The ID map may be displayed by using colors to make it easy to distinguish regions associated with the respective IDs. If the preview image is a color (chromatic color) image, the ID map may be displayed using grayscale (achromatic color). If the preview image is a grayscale (achromatic color) image, the ID map may be displayed by using colors (chromatic colors). Alternatively, color having a hue not included in the entirety or part of the preview image may be used to display the ID map.

In addition, a guide for the colors of the displayed ID map may be displayed in the screen presented to the user, or information that identifies the input image (e.g., ID or input file name) may be superimposed on the ID map. It may be desirable that the user be allowed to specify and change transparency (weight) of the information that is superimposed. Once the preview image and the ID map are presented to the user, the process proceeds to step S1006.

In step S1006, the user input obtaining unit 907 obtains user input. If the user is satisfied with the preview image, the user performs an operation indicating so. For example, the user clicks an "OK" button (not illustrated) included in the presented screen by using the input device 108, such as a mouse. If the user is not satisfied with the preview image, the user performs an operation (changing operation) to change the ID map. For example, the user drags a cursor 1202 by using the input device 108, such as a mouse, to adjust the boundary in the ID map.

In step S1007, the user input obtaining unit 907 determines whether the user is satisfied with the preview image. Specifically, the user input obtaining unit 907 determines YES if the user input is the operation indicating that the user is satisfied with the preview image, and the process proceeds to step S1009. The user input obtaining unit 907 determines NO if the user input is the changing operation, and the process proceeds to step S1008. In step S1008, the ID map changing unit 908 changes the ID map on the basis of the user's changing operation.

Figure 13:
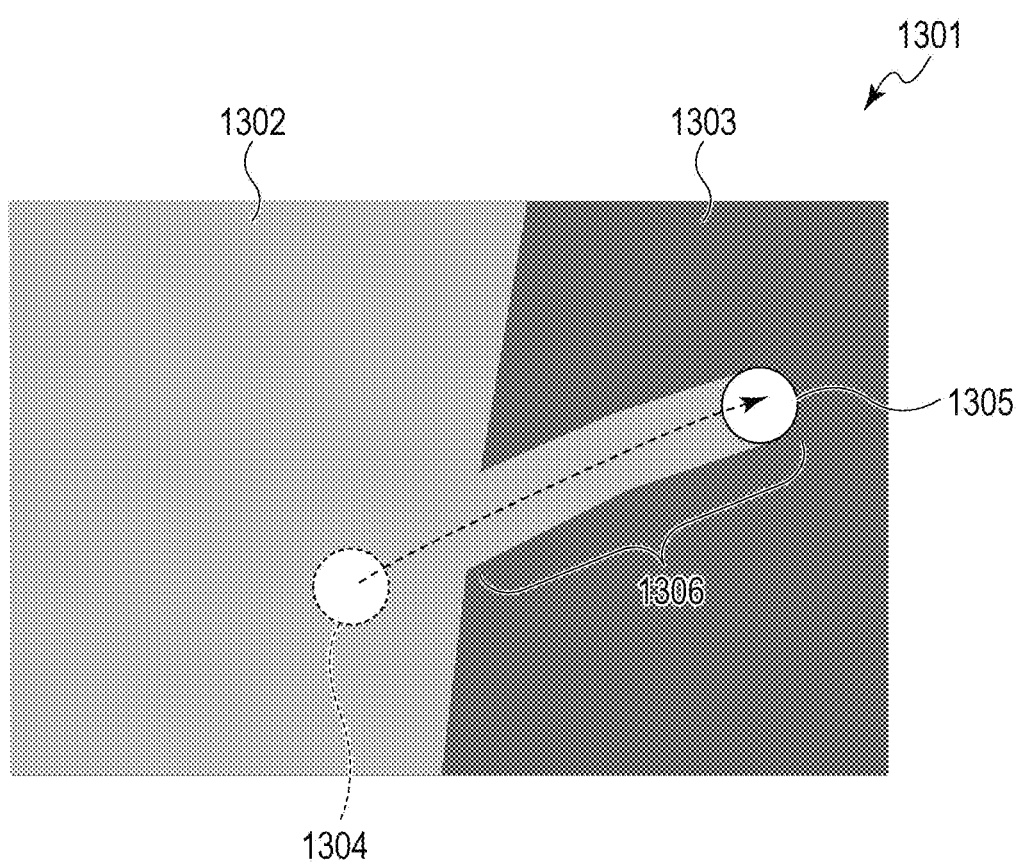
FIG. 13 is a diagram for describing an operation for changing the ID map in accordance with the first exemplary embodiment.

FIG. 13 is a diagram for describing the ID map changing operation in accordance with the first exemplary embodiment. FIG. 13 is an enlarged view of an ID map portion 1301 in the vicinity of the boundary illustrated in FIG. 12. A region 1302 displayed using a bright color is a region associated with the ID "1", whereas a region 1303 displayed using a dark color is a region associated with the ID "2". It is assumed that the cursor 1202 in FIG. 12 is moved from a position of a start point 1304 to a position 1305 by performing a drag operation in FIG. 13. Based on such an operation, the ID map changing unit 908 replaces each ID on a path 1306 of the drag operation with the ID "1" associated with the start point 1304 of the drag operation. That is, the ID associated with the path 1306 of the drag operation is changed from "2" to "1" in FIG. 13. Note that the cursor 1202 may have any size, and it is desirable that the user is allowed to specify the size of the cursor 1202 separately.

After the ID map has been changed in step S1008, the process returns to step S1004. Since changing the ID map is synonymous with changing the position of the boundary, the preview image creating unit 905 creates, in step S1004, the preview image again in accordance with the ID map in which the position of the boundary has been changed. Then, in step S1005, the display control unit 906 updates the preview image presented to the user. If the user is not satisfied with the updated preview image, the user performs the changing operation for changing the ID map. In response to the changing operation, processing of steps S1006 and S1007 is performed, and then the process proceeds to step S1008 and returns to step S1004. That is, the processing of steps S1006 to S1008 and the processing of steps S1004 to S1005 are repeatedly performed until the user is satisfied with the preview image. On the other hand, if the user is satisfied with the updated preview image, the user performs an operation indicating so. In response to this operation, the processing of steps S1006 to S1007 is performed, and then the process proceeds to step S1009. In step S1009, the current position of the boundary is output to the output image generating unit 207 as a result output from the boundary determining unit 206. Then, the boundary determining process ends.

The boundary determining process according to the first exemplary embodiment allows the user to precisely specify the boundary. For example, the user can specify the boundary so that the boundary includes a portion with a sharp angle or a thin portion or so that the boundary fits a complicated shape of the scene or can finely change the position of the boundary on a pixel-by-pixel basis. In addition, since the user can repeatedly change the boundary while checking the result of the change by viewing the boundary superimposed on the preview image, the intention of the user can be reflected in the image and an image satisfying the user more can be obtained.

Further, the boundary determining process described above uses the ID of the start point of the drag operation when the ID is replaced with another ID. In this way, the ID associated with the regions assigned the IDs "1" and "2" can be changed speedily, which contributes to improvement of efficiency. This configuration is based on the property that a region in which the same image is used is enclosed by a simple closed surface in most cases in the image stitching process. However, in order to make it possible to specify the ID individually for each pixel, a mode for directly specifying the ID instead of using the ID assigned to the drag start point may be included.

Figure 14A:
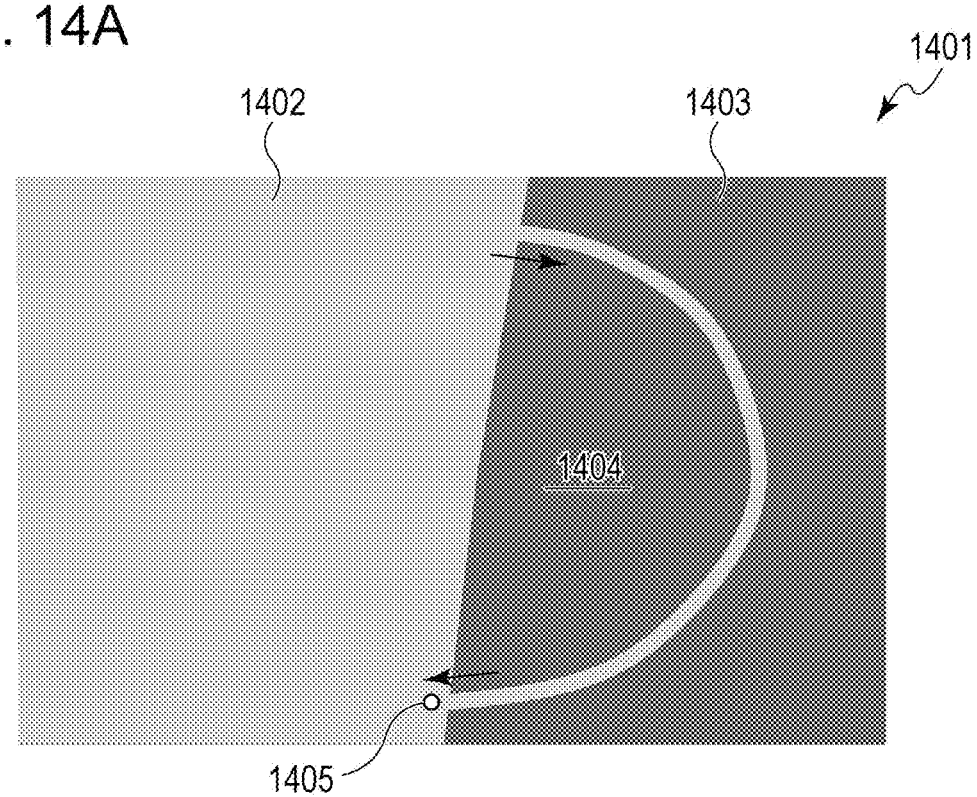
FIGS. 14A and 14B are diagrams for describing an operation for changing the ID map in accordance with the first exemplary embodiment.
Figure 14B:
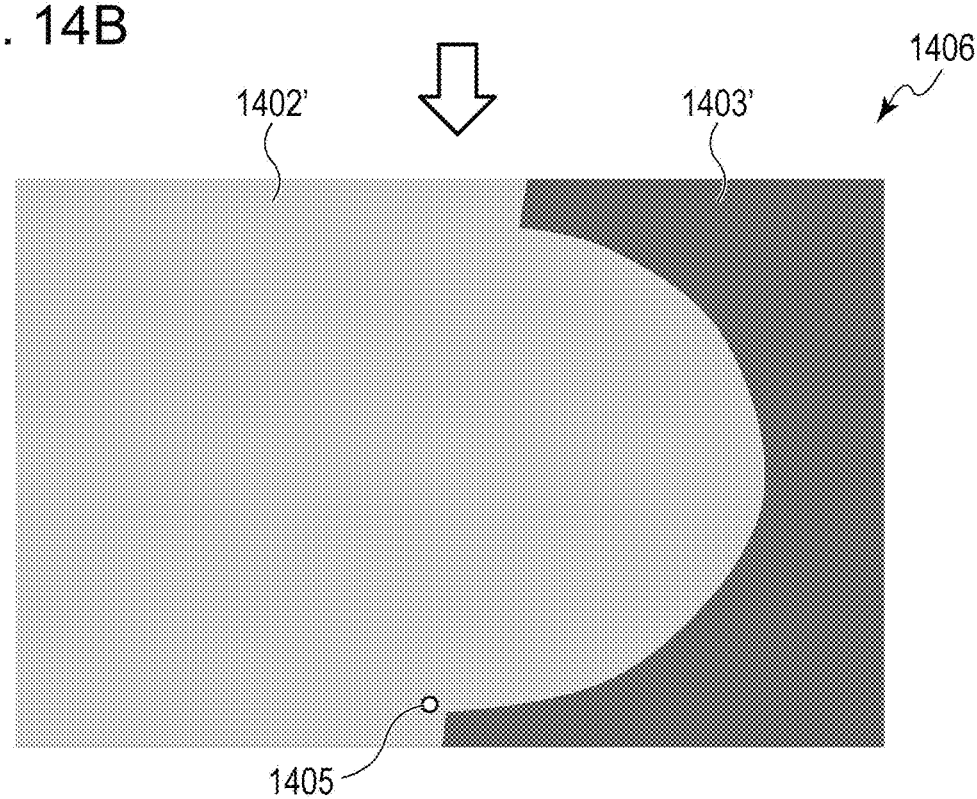

Further, to improve the efficiency of the drag operation, the image processing apparatus 100 according to the first exemplary embodiment may have a function for setting, as an ID replacement target area, not only the path of the drag operation but also a closed region created by the path of the drag operation if such a closed region is created as illustrated in FIGS. 14A and 14B. The closed region is created by the cursor 1405. The ID of a closed region 1404 in an ID map 1401 illustrated in FIG. 14A is changed from "2", which is the same as that of a region 1403 displayed using a dark color, to the ID "1", which is the same as that of a region 1402 displayed using a bright color. Consequently, an ID map 1406 illustrated in FIG. 14B is created. This configuration is also based on the property that a region in which the same image is used is enclosed by a simple closed surface. In this way, a situation where a pixel desired to be specified to be in the target area is excluded from the range of the drag operation is successfully avoided, and load of the drag operation is successfully reduced when the user desires to specify a wide range of pixels as the target region, thus contributing to improvement of efficiency.

To assist the user in specifying the boundary precisely, the image processing apparatus 100 according to the first exemplary embodiment may further have a function for correcting the path of the drag operation to be on an edge if the path of the drag operation performed by the user is substantially along an edge component in the image. Any known technique can be used to determine whether the path of the drag operation is along the edge component in the image. With this function, load required to precisely track the edge through a user drag operation is successfully reduced when the user desires to set the boundary along the edge of the image.

Further, to ensure the safety for specifying the boundary, the image processing apparatus 100 according to the first exemplary embodiment may have a function of limiting a range in which the boundary can be specified by a drag operation. In the first exemplary embodiment, the user is allowed to change the ID map in any manner. Accordingly, the user may specify pixels in a region outside the mapping of the image to replace the ID associated with such pixels with the ID of the corresponding image. For example, in FIG. 5, the image 2 is not specifiable to be used in the region 401 and the image 1 is not specifiable to be used in the region 402; however, a user operation for such a specification is allowed. Accordingly, the image processing apparatus 100 may have a function for disabling replacement of the ID for a dragging operation to a region beyond the range of the mapping so that the user is not allowed to specify the boundary in a range beyond the range of the mapping of the image. In addition, if the user drag operation extends beyond the range of the mapping, a warning indicating so may be issued to the user. Further, to suppress such an operation, the range of the mapping may be presented to the user. The range of the mapping may be always presented along with the ID map and the preview image, or the range of the mapping of the image corresponding to the ID associated with the start point may be presented only during the drag operation. In this way, a situation where the output image refers to information that does not exist and a failure occurs is successfully prevented. It is also possible to prompt the user to perform a correct operation.

In addition to the preview image, another image obtained by superimposing the entire mappings regardless of the position of the boundary may be presented to the user. The user can refer to such an image when determining the position of the boundary. All the mappings can be superimposed; however, it is desirable that the user be allowed to select which mapping of the image is to be displayed so that information presented to the user does not become complicated. With the configuration described above, the user can precisely change the boundary in the image stitching process according to their intention by performing an intuitive operation.

Second Exemplary Embodiment

The case where still images are input has been described in the first exemplary embodiment. In a second exemplary embodiment, the case where a moving image including a plurality of frames in the time-axis direction is input will be described. The first exemplary embodiment is also applicable to the case where a moving image is input by using corresponding frames (frame images) as the input images. However, since the scene changes over time in the case of moving images, the position of the boundary which is appropriate at a certain time point is not necessarily appropriate in another frame. Such an issue is coped with if different boundaries can be specified for different frames; however, since moving images usually include many frames, performing the same operation as that of the first exemplary embodiment for all frames imposes heavy load on the user. In addition, since a period for one frame of a moving image is extremely short, it is highly likely that the position of the boundary that is appropriate at a certain time point is also appropriate at another time point.

Figure 15:
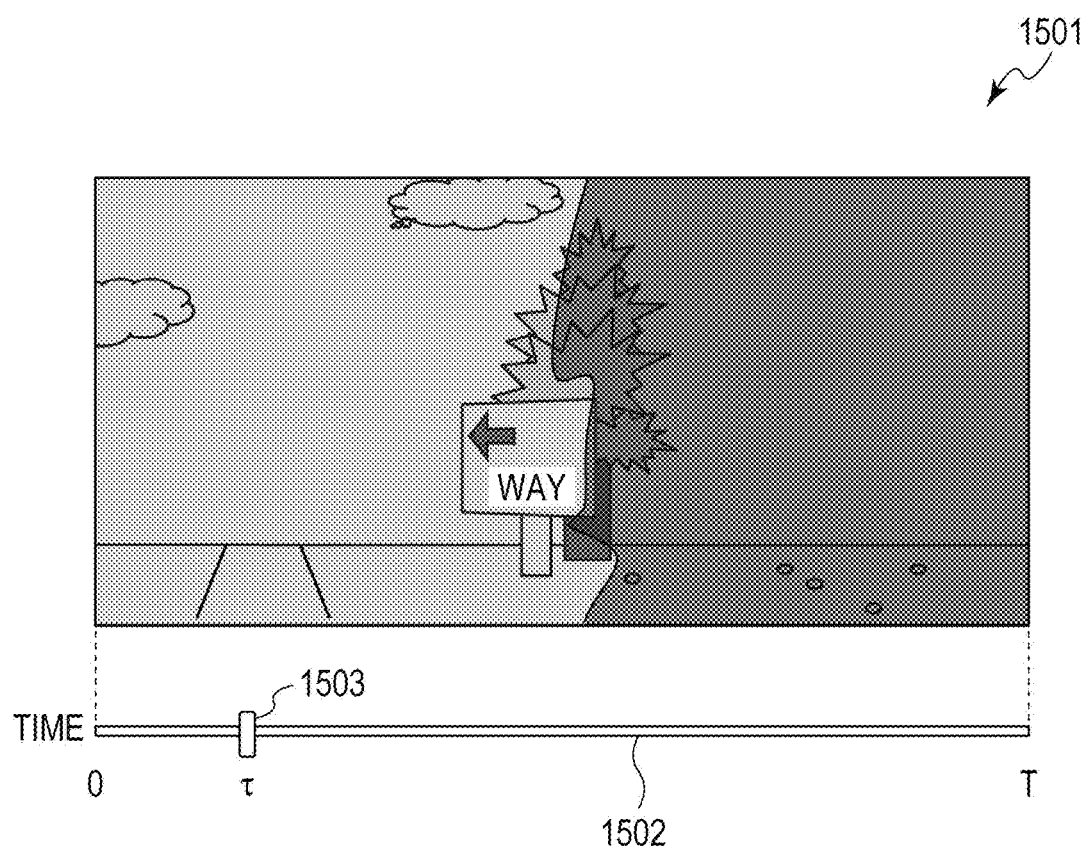
FIG. 15 is a diagram schematically illustrating information presented to the user in accordance with a second exemplary embodiment.

FIG. 15 is a diagram schematically illustrating information presented to the user when an ID map and a preview image are superimposed and displayed to the user in accordance with the second exemplary embodiment. In addition to an image display region 1501 in which the ID map and the preview image, which are presented to the user, are superimposed and displayed, a seek bar 1502 representing duration of a moving image and a slider 1503 indicating the position of a processing-target frame in the duration of the moving image are presented to the user. It is assumed that duration of the moving image is from 0 to T, and the processing-target frame is a frame at a time point τ.

In the second exemplary embodiment, the ID map changed in response to a user operation at the time point τ is applied to frames of the moving image at and after the time point τ. That is, the ID map (position of the boundary) that is set or changed by using the first frame (frame at τ=0) as the processing target sets ID maps for all frames of the moving image. A change in the ID map made by using a frame at a time point that is three seconds after the start (frame at τ=3) is reflected in only the ID maps for frames at and after three seconds.

After setting the position of the boundary by using the frame at τ=0, the user typically advances the processing-target time τ by playing the moving image or moving the slider 1503 to the right. As the processing time τ advances, the preview image also changes. When a certain time point τ=T1 at which the boundary is no longer appropriate due to the scene change has come, the boundary is adjusted to be appropriate for the frame at τ=T1 on the basis of the boundary for the frame at τ=0 which has already been set in the processing performed at τ=0. In this way, the position of the boundary used for frames at and after the time point T1 is changed. After the adjustment has been finished, the processing time τ is advanced again. In this way, the user can set/change the position of the boundary only at a necessary position a necessary number of times while checking whether the output result has a desired quality and can efficiently complete setting of the boundary from the start to the end of the moving image.

The case where a moving image including a plurality of frames in the time-axis direction is input has been described above; however, the case where the second exemplary embodiment is applied is not necessarily limited to the case where only a moving image is input. The second exemplary embodiment is also applicable to the case where a moving image and images (still images) coexist by repeatedly setting, as the processing target, an image (still image) in association with each frame of the moving image.

Third Exemplary Embodiment

It is assumed in the first and second exemplary embodiments that each pixel in the ID map is associated only a single ID; however, in a third exemplary embodiment, each pixel in the ID map can be associated with a plurality of IDs and can be associated with a plurality of images.

Figure 16:
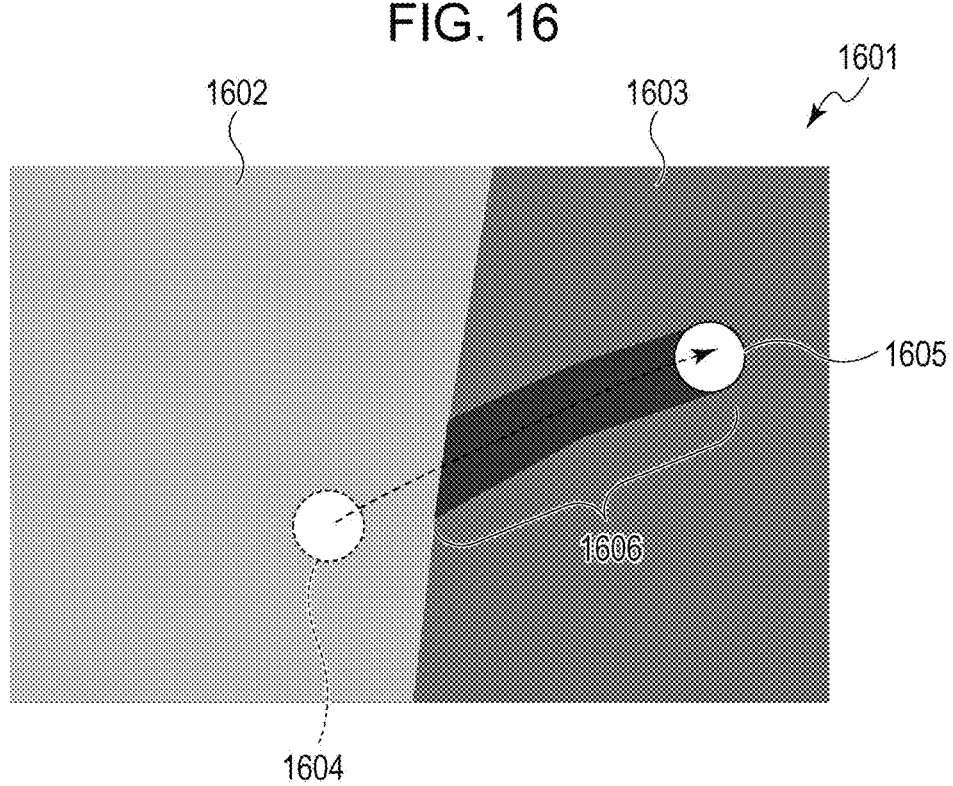
FIG. 16 is a diagram for describing an operation for changing an ID map in accordance with a third exemplary embodiment.

FIG. 16 is a diagram for describing the ID map changing operation in accordance with the third exemplary embodiment. FIG. 16 illustrates an enlarged view of an ID map portion 1601 in the vicinity of the boundary illustrated in FIG. 12. A region 1602 displayed using a bright color and a region 1603 displayed using a dark color are a region associated with the ID "1" and a region associated with the ID "2", respectively. It is assumed that a cursor is dragged from a start position 1604 to a position 1605 in FIG. 16. An ID map changing unit according to the third exemplary embodiment additionally assigns the ID "1" associated with the start position 1604 of the drag operation to a path 1606 of the drag operation. That is, the path 1606 of the drag operation illustrated in FIG. 16 is associated with both the ID "2" and the ID "1" in response to the drag operation. As illustrated in FIG. 16, the region associated with the plurality of IDs is displayed by using a color different from that of the original ID map so that the region is distinguished. A configuration where one pixel is associated with two IDs can be implemented, for example, in the following manner. Two ID maps are prepared just like layers. One of the two ID maps stores the first ID, whereas the other ID map stores the second ID. If the pixel is not associated with the second ID, the pixel is associated with a specific pixel value (0, for example).

At each pixel associated with two IDs, both the images are blended together and a result is output. For example, masks $M1(x, y)$ and $M2(x, y)$ respectively indicate whether the ID of the image 1 and the ID of the image 2 are associated at coordinates $(x, y)$ of an output image R by using 1 or 0, and $I1(x, y)$ and $I2(x, y)$ respectively indicate pixel values at the coordinates $(x, y)$ of the image 1 and the image 2. In this case, the pixel value in the output image R is determined by using Equation (1).

$$R(x, y) = \frac{M1(x, y) \times I1(x, y) + M2(x, y) \times I2(x, y)}{M1(x, y) + M2(x, y)} \quad \text{Equation (1)}$$

With this configuration, a complicated shape such as a sharp bend or a thin portion can be specified or blending can be controlled in accordance with characteristics of the scene not only at the boundary in the image stitching process but also in other regions where blending of images is desired. Accordingly, an output image in which the user's intention is reflected more can be generated.

The addition of the ID according to the third exemplary embodiment and the replacement of the ID according to the first exemplary embodiment are desirably used in combination. For example, the ID is replaced in response to a drag operation at the time of ordinary operation. The image processing apparatus 100 may enter a mode for adding the ID if an operation is performed while a specific key of the input device (may be the same device used to perform the drag operation or a different device) being pressed. With this configuration, changing the position of the boundary based on the path of the drag operation by using the ID map is suitably used in the case where a plurality of images are specified for a single pixel.

In addition, in the third exemplary embodiment, when a pixel associated with two IDs in the ID map is selected as the start point of the drag operation, there are two candidate IDs of the start point to be used for replacement or addition. Accordingly, the image processing apparatus 100 according to the third exemplary embodiment further includes a function for prompting the user to select which ID is to be used from among the candidate IDs of the start point.

Figure 17:
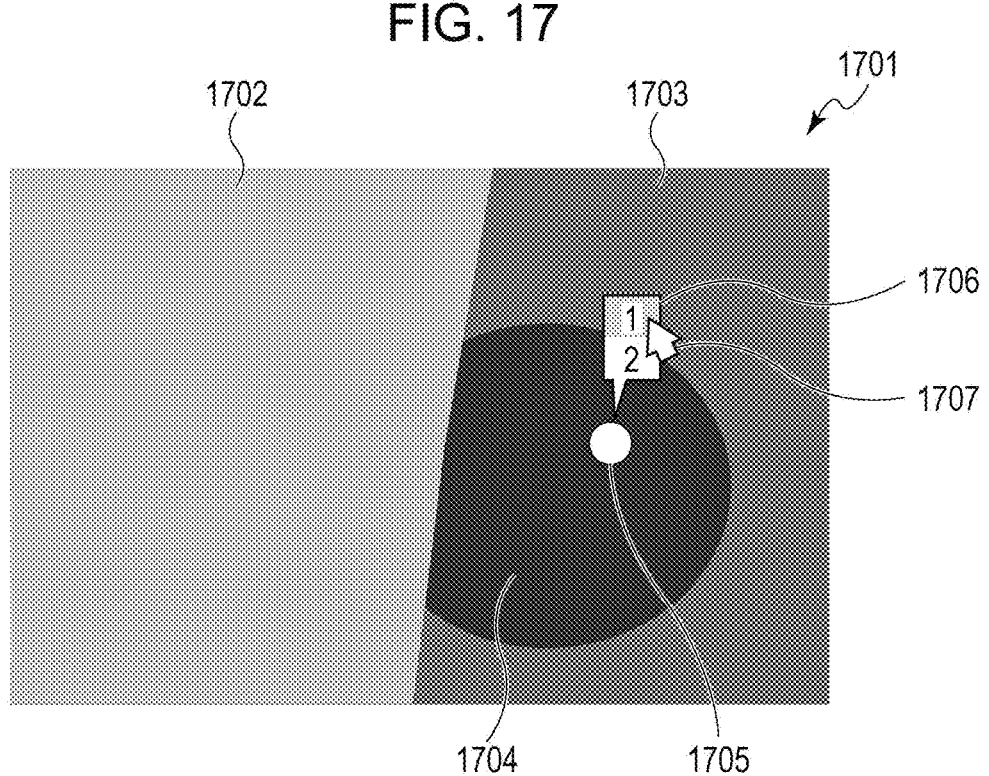
FIG. 17 is a diagram schematically illustrating information presented to a user when the user determines the ID of a drag start point in accordance with the third exemplary embodiment.

FIG. 17 is a diagram schematically illustrating information presented to the user when the user determines the ID of the drag start point in accordance with the third exemplary embodiment. In FIG. 17, a cursor 1705 represents the position where a drag operation is started in a region 1704 associated with two IDs "1" and "2". If a drag operation is started in a region in which a plurality of IDs are set, a small pop-up 1706 is displayed near the start point and shows a list of candidate IDs. At that same time, a second cursor 1707 is displayed at the position of the cursor 1705, and the second cursor 1707 is now set as the operation target of the input device. The user moves the second cursor 1707 to select the ID in the pop-up 1706. Then, the pop-up 1706 and the second cursor 1707 are hidden, and the cursor 1705 is now set as the operation target of the input device. The process of changing the ID map can be restarted by performing a drag operation on the cursor 1705 by using the ID selected using the second cursor 1707.

Other Exemplary Embodiments

In the above-described exemplary embodiments, the ID map changing unit 908 is separated from the ID map creating unit 904; however, the ID map changing unit 908 may be included in the ID map creating unit 904. The exemplary embodiments described above may be carried out in combination as well as being used independently. Further, following embodiments are also possible as modifications of the exemplary embodiments. The drag operation performed in the above-described exemplary embodiments is not limited only to an operation performed using a mouse which is a common input device but can be replaced with various inputs of the similar type performed using a pointing device, for example, an input performed using a pen-type input device.

The description has been given by using two input images in the exemplary embodiments to make the description easier; however, the number of input images is not limited to two. The exemplary embodiments described above are applicable to the case of using two or more (a plurality of) images. For example, the exemplary embodiments described above are applicable to the following cases. Specifically, the exemplary embodiments described above are applicable even to the case where a plurality of images captured using a plurality of cameras that are arranged to correspond to all the directions are used as the input images to generate 360-degree all-direction panorama image. In addition, the exemplary embodiments described above are applicable even to the case where a plurality of images captured by a stereo image capturing apparatus to obtain a stereoscopic image are used as the input images. In addition, the exemplary embodiments described above are applicable even to the case where a plurality of images captured using the plurality of cameras directed toward inside instead of outside are used as the input images.

In the above description (e.g., the description of the example of generating a panorama image), a plurality of input images are obtained by capturing the images using a plurality of cameras; however, the way of obtaining the input images is not limited to this one and the plurality of input images may be obtained using a single camera by changing the image capturing time. For example, instead of simultaneously using the cameras C1 and C2 in FIG. 4, an image may be obtained at the position of the C1 by using a single camera, and then another image may be captured after moving the camera to the position of the camera C2. In addition, images may be captured by using a plurality of cameras at different image capturing times.

The exemplary embodiments can be implemented in the following manner. A program for implementing one or more functions of the above-described exemplary embodiments is supplied to a system or an apparatus via a network or a recording medium, and one or more processors in a computer of the system or the apparatus reads and executes the program. In addition, the exemplary embodiments of the present disclosure can also be implemented by a circuit (e.g., Application Specific Integrated Circuit (ASIC)) that implements one or more functions.

Accordingly, the user is able to control the boundary in an image stitching process according to their intention and obtain a desired composite image.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-254346, filed Dec. 25, 2015, which is hereby incorporated by reference herein in its entirety.

What is claimed is:

1. An image processing method for creating a composite image by using a plurality of input images, comprising:
   creating an ID map in which each pixel on a coordinate system of the composite image is assigned an ID value among ID values each of which identifies a corresponding one of the plurality of input images;
   creating the composite image based on the ID map;
   causing the composite image and the ID map to be superimposed and displayed on a display device;
   obtaining user input that is a drag operation performed on the ID map that is superimposed and displayed together with the composite image;
   changing the ID map in accordance with the user input; and
   updating the composite image in accordance with the change in the ID map.

2. An image processing apparatus that creates a composite image by using a plurality of input images, comprising:
   one or more processors; and
   at least one memory coupled to the one or more processors and storing instructions that, when executed by the one or more processors, cause the image processing apparatus to:
   create an identifier (ID) map in which each pixel on a coordinate system of the composite image is assigned an ID value among ID values each of which identifies a corresponding one of the plurality of input images;
   create the composite image based on the ID map;
   cause the composite image and the ID map to be superimposed and displayed on a display device; and
   obtain user input that is a drag operation performed on the ID map that is superimposed and displayed together with the composite image,
   change the ID map in response to the user input, and
   update the composite image in accordance with the change in the ID map.

3. The image processing apparatus according to claim 2, further changing the ID map by replacing each ID value on a path of the drag operation with an ID value assigned to a start point of the drag operation.

4. The image processing apparatus according to claim 3, further changing the ID map by replacing, in a case where a new closed region is formed as a result of replacing each ID value on the path of the drag operation with the ID value assigned to the start point of the drag operation, each ID value in the closed region with the ID value assigned to the start point in addition to the replacing each ID value on the path of the drag operation.

5. The image processing apparatus according to claim 3, wherein upon determining that the path of the drag operation is substantially along an edge in the composite image, correct the path of the drag operation such that the path matches the edge and then changes the ID map on the basis of a resultant path obtained by the correction.

6. The image processing apparatus according to claim 3, further comprising:
   map the plurality of input images onto the coordinate system of the composite image to obtain a plurality of mappings each corresponding to one of the plurality of input images,
   create the composite image by linking the mappings together, and
   determine, from among the plurality of mappings of the plurality of input images, based on the ID map, which mapping of the input image is to be used in a region where the mappings overlap when linking the mappings together.

7. The image processing apparatus according to claim 6, further restricting a region where each ID value is replaceable with the ID value assigned to the start point of the drag operation to a range of the mapping of the input image corresponding to the ID value assigned to the start point.

8. The image processing apparatus according to claim 6, further causing the mappings to be displayed by using an image display region different from a region where the composite image and the ID map are displayed.

9. The image processing apparatus according to claim 2, further causing the ID map to be displayed such that regions assigned different ID values in the ID map are distinguishable from one another.

10. The image processing apparatus according to claim 2, further displaying the composite image and the ID map by using a chromatic color for one of the composite image and the ID map and an achromatic color for the other of the composite image and the ID map, or displays the composite image and the ID map to have different hues or luminances.

11. The image processing apparatus according to claim 2, further changing the ID map by additionally associating an ID value assigned to a start point of the drag operation with each pixel on a path of the drag operation.

12. The image processing apparatus according to claim 2, wherein at least one of the plurality of input images is a frame image of a moving image, and the change made in the ID map are used for all frame images at and after a time point of the frame image.

13. A non-transitory computer-readable storage medium storing a program comprising:
   creating an ID map in which each pixel on a coordinate system of a composite image created by using a plurality of input images is assigned an ID value among ID values each of which identifies a corresponding one of the plurality of input images;
   creating the composite image based on the ID map;
   causing the composite image and the ID map to be superimposed and displayed on a display device;
   obtaining user input that is a drag operation performed on the ID map that is superimposed and displayed together with the composite image;
   changing the ID map in accordance with the user input; and updating the composite image in accordance with the change in the ID map.

\* \* \* \* \*